US009426311B2

(12) United States Patent
Tosa et al.

(10) Patent No.: US 9,426,311 B2
(45) Date of Patent: Aug. 23, 2016

(54) IMAGE FORMING APPARATUS, METHOD OF CORRECTING IMAGE MAGNIFICATION, AND COMPUTER-READABLE RECORDING MEDIUM

(71) Applicants: Shigeru Tosa, Kanagawa (JP); Hitoshi Kamoshida, Ibaraki (JP); Tetsuya Ogawa, Kanagawa (JP)

(72) Inventors: Shigeru Tosa, Kanagawa (JP); Hitoshi Kamoshida, Ibaraki (JP); Tetsuya Ogawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/740,402

(22) Filed: Jun. 16, 2015

(65) Prior Publication Data
US 2015/0371119 A1    Dec. 24, 2015

(30) Foreign Application Priority Data

Jun. 20, 2014  (JP) .................................. 2014-127481

(51) Int. Cl.
| G06K 1/00 | (2006.01) |
| H04N 1/00 | (2006.01) |
| G06K 15/02 | (2006.01) |
| H04N 1/60 | (2006.01) |

(52) U.S. Cl.
CPC .............. *H04N 1/00* (2013.01); *G06K 15/1868* (2013.01)

(58) Field of Classification Search
CPC .............................. H04N 1/00; G06K 15/1868
USPC ..................... 358/1.9, 1.15; 347/14, 104, 9
See application file for complete search history.

(56) References Cited

U.S. PATENT DOCUMENTS

| 2008/0019718 A1 | 1/2008 | Akatsu et al. |
| 2011/0134178 A1* | 6/2011 | Chiwata ..................... B41J 3/60 347/14 |
| 2012/0291299 A1 | 11/2012 | Kudo et al. |

FOREIGN PATENT DOCUMENTS

| JP | 2007-072094 | 3/2007 |
| JP | 2007-079262 | 3/2007 |
| JP | 2009-042461 | 2/2009 |
| JP | 2013-107774 | 6/2013 |

* cited by examiner

*Primary Examiner* — Quang N Vo
(74) *Attorney, Agent, or Firm* — Cooper & Dunham LLP

(57) ABSTRACT

An image forming apparatus includes: an expansion/contraction ratio calculation unit that calculates a value of a ratio of expansion or contraction of a printing medium at a time of printing a second surface as compared with a time of printing a first surface; a storage control unit that causes an NVRAM to hold the calculated value of the ratio of expansion or contraction; and a magnification correcting unit that corrects magnification of an image on the second surface using a newly calculated value of the ratio when a difference between the newly calculated value and a value that has been held by the NVRAM until the new value is calculated is within a predetermined range, and corrects the magnification of the image on the second surface using a value closer to 0 than the newly calculated value when the difference exceeds the predetermined range.

8 Claims, 7 Drawing Sheets

FIG.6

SUB-SCANNING DIRECTION

| | INDIVIDUAL RATIO OF EXPANSION OR CONTRACTION | MOVING AVERAGE OF FOUR PRINTING MEDIA | DIFFERENCE | VALUE USED FOR CORRECTION |
|---|---|---|---|---|
| FIRST PRINTING MEDIUM | -0.0962 | | | |
| SECOND PRINTING MEDIUM | -0.1634 | | | |
| THIRD PRINTING MEDIUM | -0.1250 | | | |
| FOURTH PRINTING MEDIUM | -0.1009 | -0.1214 | -0.1214 | -0.0607 |
| FIFTH PRINTING MEDIUM | -0.1297 | -0.1298 | -0.0084 | -0.1298 |
| SIXTH PRINTING MEDIUM | -0.1009 | -0.1141 | +0.0157 | -0.1141 |
| SEVENTH PRINTING MEDIUM | -0.1250 | -0.1141 | 0 | -0.1141 |
| ⋮ | ⋮ | ⋮ | ⋮ | ⋮ |

FIG.7

MAIN SCANNING DIRECTION

| | INDIVIDUAL RATIO OF EXPANSION OR CONTRACTION | MOVING AVERAGE OF FOUR PRINTING MEDIA | DIFFERENCE | VALUE USED FOR CORRECTION |
|---|---|---|---|---|
| FIRST PRINTING MEDIUM | -0.1518 | | | |
| SECOND PRINTING MEDIUM | -0.1519 | | | |
| THIRD PRINTING MEDIUM | -0.1140 | | | |
| FOURTH PRINTING MEDIUM | -0.1519 | -0.1424 | -0.1424 | -0.0712 |
| FIFTH PRINTING MEDIUM | -0.1234 | -0.1353 | +0.0071 | -0.1353 |
| SIXTH PRINTING MEDIUM | -0.1423 | -0.1329 | +0.0024 | -0.1329 |
| SEVENTH PRINTING MEDIUM | -0.1234 | -0.1353 | -0.0024 | -0.1353 |
| ⋮ | ⋮ | ⋮ | ⋮ | ⋮ |

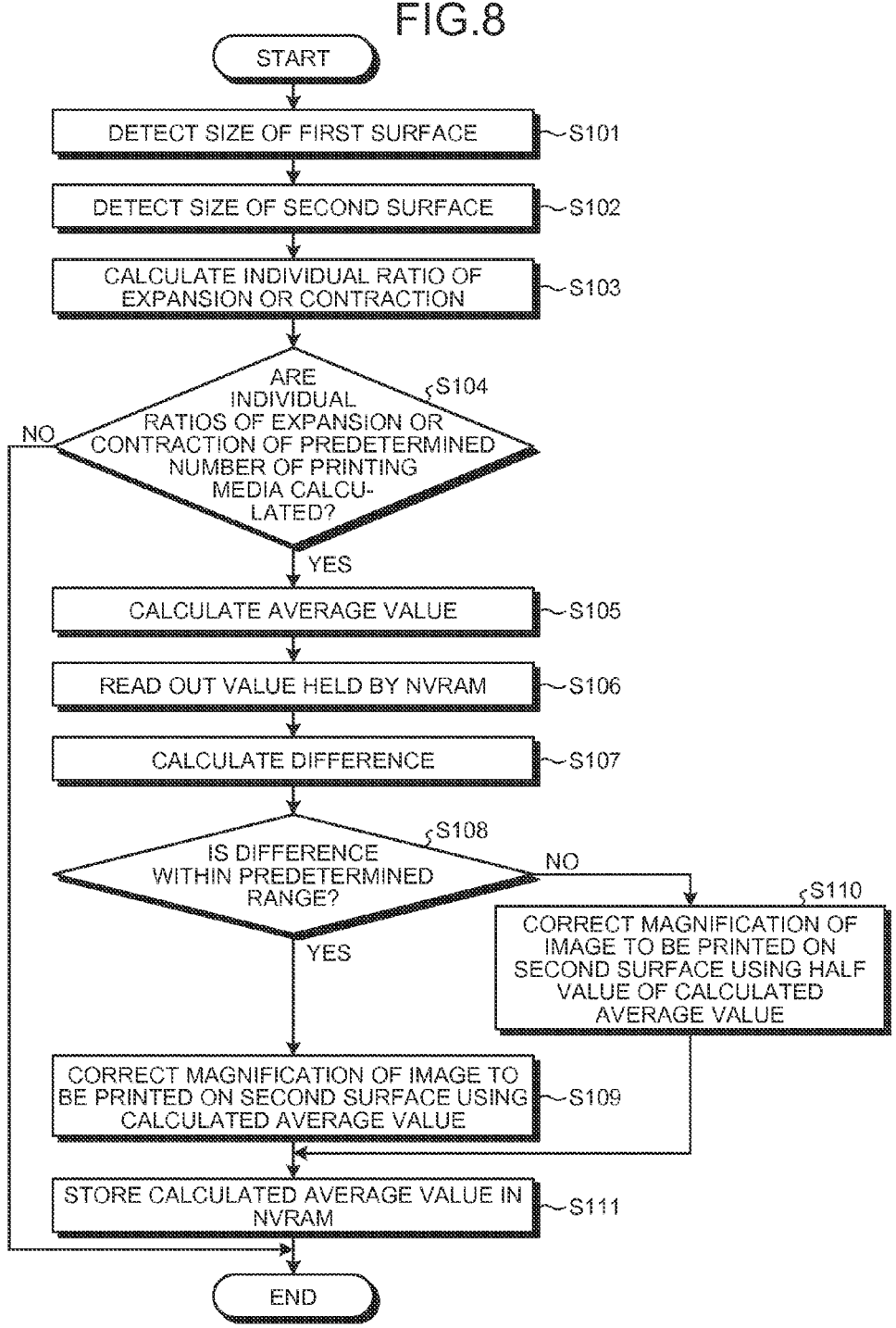

IMAGE FORMING APPARATUS, METHOD OF CORRECTING IMAGE MAGNIFICATION, AND COMPUTER-READABLE RECORDING MEDIUM

CROSS-REFERENCE TO RELATED APPLICATIONS

The present application claims priority to and incorporates by reference the entire contents of Japanese Patent Application No. 2014-127481 filed in Japan on Jun. 20, 2014.

BACKGROUND OF THE INVENTION

1. Field of the Invention

The present invention relates to an image forming apparatus, a method of correcting image magnification, and a computer-readable recording medium.

2. Description of the Related Art

When an image forming apparatus performs double-side printing on a printing medium, the printing medium is expanded or contracted due to influence of heat given at the time of printing a first surface (front surface). Therefore, the size of the printing medium may be slightly changed at the time of printing a second surface (back surface) as compared with the size at the time of printing the first surface. Such a change in size of the printing medium is a factor of misregistration of the front and the back of printed matter generated through double-side printing. Due to this, a method is known for detecting each size of the printing medium before the first surface is printed and before the second surface is printed to calculate a ratio of expansion or contraction, and correcting magnification of an image to be printed on the second surface corresponding to the ratio of expansion or contraction (for example, refer to Japanese Laid-open Patent Publication No. 2007-72094, Japanese Laid-open Patent Publication No. 2007-79262, and Japanese Laid-open Patent Publication No. 2009-42461).

The ratio of expansion or contraction of the printing medium mainly depends on a type of the printing medium and a temperature of the image forming apparatus that varies corresponding to elapsed time from the start of printing. Also known is a method of setting a representative value of the ratio of expansion or contraction that is estimated corresponding to the type of the printing medium as an initial value in a storage unit in advance, and correcting the magnification using the latest value of the ratio of expansion or contraction held by the storage unit while updating the storage unit with the value of the ratio of expansion or contraction that is calculated as needed in printing. In this example, when a difference between a newly calculated value of the ratio of expansion or contraction and a value held by the storage unit exceeds a predetermined range, the storage unit is not updated and the newly calculated value of the ratio of expansion or contraction is discarded. This is because the size of the printing medium is considered not to be correctly detected according to the fact that the newly calculated value of the ratio of expansion or contraction varies largely from the previous values, so that reliability of the calculated value of the ratio of expansion or contraction is low. When the magnification is corrected using the largely varied value of the ratio of expansion or contraction, variation in size of the image is noticeable among printing media that are successively printed, which should be prevented.

In the above method of correcting the magnification corresponding to the latest ratio of expansion or contraction held by the storage unit, the magnification can be appropriately corrected following a change in temperature of the image forming apparatus so long as a representative value of the ratio of expansion or contraction that is estimated depending on a type of the printing medium is set as an initial value in the storage unit first. The representative value of the ratio of expansion or contraction set as the initial value needs to be obtained by performing double-side printing in advance under the same condition as in actual printing and measuring the size of the printing medium. The operation of obtaining the representative value of the ratio of expansion or contraction in advance is complicated. In particular, a large number of types of printing media are provided in recent years, so that it is very complicated to obtain respective representative values of the ratio of expansion or contraction for all types of printing media in advance.

SUMMARY OF THE INVENTION

It is an object of the present invention to at least partially solve the problems in the conventional technology.

According to the present invention, there is provided an image forming apparatus that performs double-side printing, the image forming apparatus comprising: an expansion/contraction ratio calculation unit that calculates a value of a ratio of expansion or contraction of a printing medium at a time of printing a second surface as compared with a time of printing a first surface; a storage control unit that causes a storage unit to hold the calculated value of the ratio of expansion or contraction while updating the value every time a new value is calculated; and a magnification correcting unit that corrects magnification of an image to be printed on the second surface using a newly calculated value of the ratio of expansion or contraction when a difference between the newly calculated value of the ratio of expansion or contraction and a value that has been held by the storage unit until the new value is calculated is within a predetermined range, and corrects the magnification of the image to be printed on the second surface using a value closer to 0 than the newly calculated value of the ratio of expansion or contraction when the difference exceeds the predetermined range.

The present invention also provides a method of correcting image magnification performed by an image forming apparatus that performs double-side printing, the method comprising: calculating, by an expansion/contraction ratio calculation unit, a value of a ratio of expansion or contraction of a printing medium at a time of printing a second surface as compared with a time of printing a first surface; causing, by a storage control unit, a storage unit to hold the calculated value of the ratio of expansion or contraction while updating the value every time a new value is calculated; and correcting, by a magnification correcting unit, magnification of an image to be printed on the second surface using a newly calculated value of the ratio of expansion or contraction when a difference between the newly calculated value of the ratio of expansion or contraction and a value that has been held by the storage unit until the new value is calculated is within a predetermined range, and correcting the magnification of the image to be printed on the second surface using a value closer to 0 than the newly calculated value of the ratio of expansion or contraction when the difference exceeds the predetermined range.

The present invention also provides a non-transitory computer-readable recording medium that contains a computer program for causing an image forming apparatus that performs double-side printing to implement: a function of an expansion/contraction ratio calculation unit that calculates a value of a ratio of expansion or contraction of a printing medium at a time of printing a second surface as compared with a time of printing a first surface; a function of a storage control unit that causes a storage unit to hold the calculated value of the ratio of expansion or contraction while updating the value every time a new value is calculated; and a function of a magnification correcting unit that corrects magnification of an image to be printed on the second surface using a newly calculated value of the ratio of expansion or contraction when a difference between the newly calculated value of the ratio of expansion or contraction and a value that has been held by the storage unit until the new value is calculated is within a predetermined range, and corrects the magnification of the image to be printed on the second surface using a value closer to 0 than the newly calculated value of the ratio of expansion or contraction when the difference exceeds the predetermined range.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram for explaining a relation between a ratio of expansion or contraction of the printing medium in a sub-scanning direction and magnification correction;

FIG. 7 is a diagram for explaining a relation between the ratio of expansion or contraction of the printing medium in the main scanning direction and magnification correction;

FIG. 8 is a flowchart illustrating an example of a processing procedure related to magnification correction;

DETAILED DESCRIPTION OF THE PREFERRED EMBODIMENTS

The following describes in detail an image forming apparatus, a method of correcting image magnification, and a non-transitory computer-readable recording medium containing a computer program according to an embodiment of the present invention with reference to the attached drawings. In the following embodiments, as an example of an image forming apparatus to which the present invention is applied, exemplified is a tandem image forming apparatus that forms full-color image using an electrophotographic system. However, an applicable image forming apparatus is not limited thereto.

First Embodiment

Figure 1:
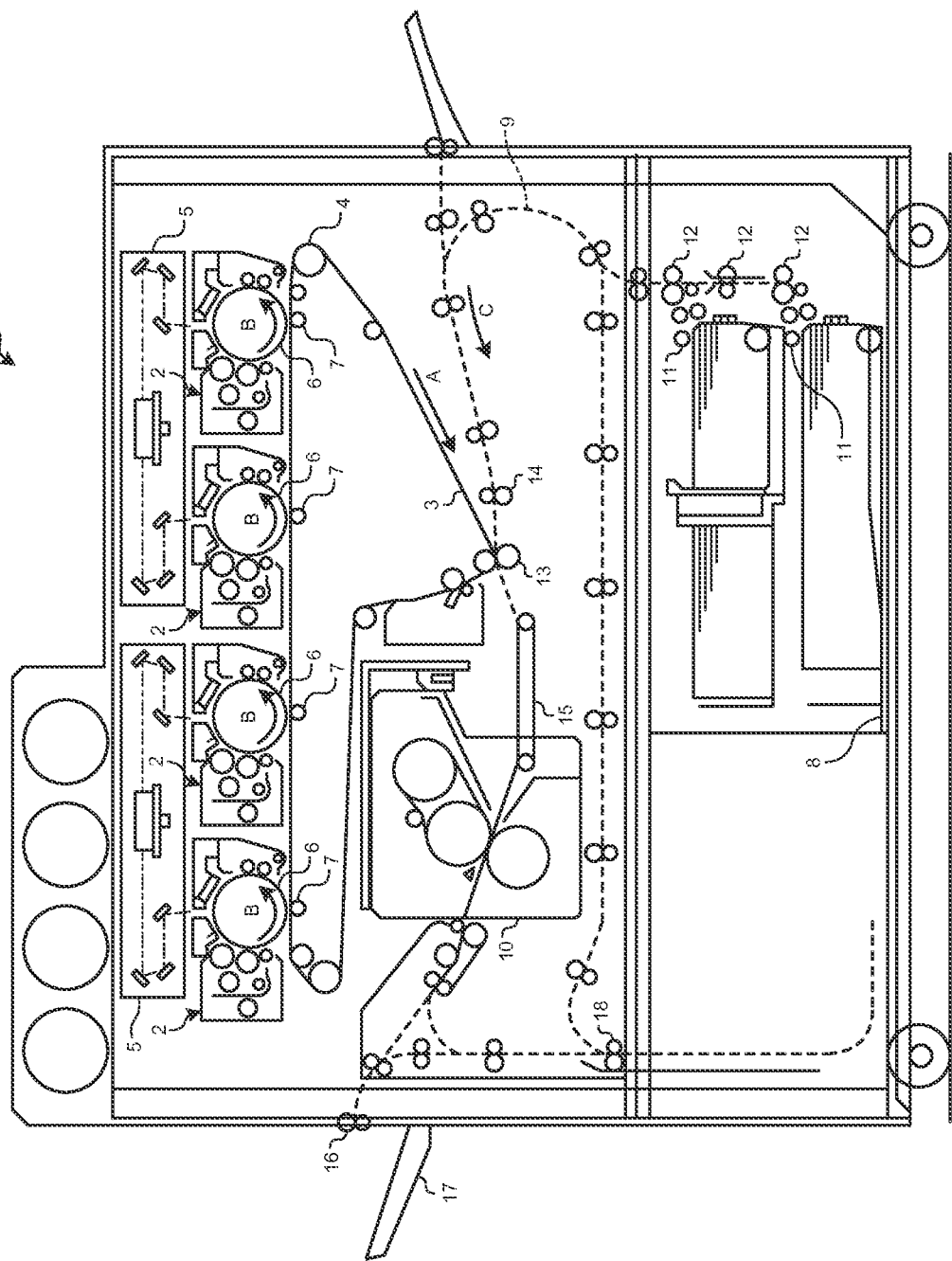
FIG. 1 is a diagram illustrating an exemplary mechanical configuration of an image forming apparatus according to an embodiment of the present invention.

FIG. 1 is a diagram illustrating an exemplary mechanical configuration of an image forming apparatus 1 according to a first embodiment of the present invention. As illustrated in FIG. 1, the image forming apparatus 1 includes four image formation units 2 corresponding to respective colors of Y (yellow), M (magenta), C (cyan), and Bk (black). Internal structures of the four image formation units 2 are the same except that colors of toner images to be formed therein are different from each other. The four image formation units 2 are arranged along an intermediate transfer belt 3 serving as an intermediate transfer body.

The intermediate transfer belt 3 is configured as an endless belt that is driven by a driving roller 4 to be circulated in the direction of arrow A in FIG. 1. The four image formation units 2 are arranged in order of Y, M, C, and Bk, for example, from an upstream side toward a downstream side of a moving direction of the intermediate transfer belt 3. An exposure unit 5 is arranged on a side opposite to the intermediate transfer belt 3 of the four image formation units 2.

The image formation unit 2 includes a photoconductor drum 6 that rotates in the direction of arrow B at a constant peripheral speed. A charging device, a developing device, a static eliminator, a cleaner, and the like are arranged around the photoconductor drum 6. A primary transfer roller 7 is arranged at a position opposed to the photoconductor drum 6 with the intermediate transfer belt 3 interposed therebetween.

To form an image, an outer peripheral surface of the photoconductor drum 6 is uniformly charged by the charging device in the dark, and exposed with writing light from the exposure unit 5 that is modulated corresponding to image data. Accordingly, an electrostatic latent image corresponding to the image data is formed on the photoconductor drum 6. The electrostatic latent image is developed by the developing device, and a toner image is formed on the photoconductor drum 6. The toner image is transferred onto the intermediate transfer belt 3 by the action of the primary transfer roller 7 at a primary transfer position where the photoconductor drum 6 is in contact with the intermediate transfer belt 3. In the photoconductor drum 6 after the toner image is transferred, unnecessary toner remaining on the outer peripheral surface is wiped out by the cleaner, and static electricity is eliminated by the static eliminator.

In the image forming apparatus 1 according to the first embodiment, the operations described above are sequentially performed in the respective image formation units 2 of Y, M, C, and Bk corresponding to circulation of the intermediate transfer belt 3 to form a full-color toner image, which is obtained by overlapping four colors, on the intermediate transfer belt 3.

The image forming apparatus 1 includes a sheet feeding table 8 for feeding a printing medium, a conveyance path 9 for conveying the printing medium (a path indicated by the dashed line in FIG. 1), and a fixing device 10 for fixing the toner image to the printing medium.

The sheet feeding table 8 selectively rotates a sheet feeding roller 11 to send out the printing media one by one from one of a plurality of trays storing the printing media. The printing medium is conveyed by a conveyance roller 12 in the direction of arrow C in FIG. 1 along the conveyance path 9, and abuts on a registration roller 14 to be in a standby state before a secondary transfer position at which a secondary transfer roller 13 is arranged. The printing medium in a standby state is then conveyed to the secondary transfer position by the rotation of the registration roller 14 at the same timing when the full-color toner image formed on the intermediate transfer belt 3 reaches the secondary transfer position. The full-color toner image on the intermediate transfer belt 3 is then transferred onto the printing medium by the action of the secondary transfer roller 13.

The printing medium onto which the toner image is transferred is conveyed to the fixing device 10 by a conveyance belt 15 arranged in the conveyance path 9. The toner image is fixed to the printing medium conveyed to the fixing device 10 due to heat and pressure applied by the fixing device 10.

In a case of single-side printing, the printing medium to which the toner image is fixed on the first surface thereof by the fixing device 10 is ejected to an ejection tray 17 by an ejection roller 16. In performing reverse paper ejection or double-side printing, the printing medium to which the toner image is fixed on the first surface thereof by the fixing device 10 passes through a reverse path in the conveyance path 9 and is once pulled in by a reverse roller 18. When the reverse roller 18 rotates reversely, the printing medium is sent out in a reversed state. In a case of reverse paper ejection, the reversed printing medium is ejected to the ejection tray 17 by the ejection roller 16. In a case of double-side printing, the reversed printing medium passes through a cyclic path in the conveyance path 9 to be conveyed to a position where the printing medium abuts on the registration roller 14. Thereafter, the toner image is transferred and fixed to the second surface of the printing medium through a similar procedure, and the printing medium is ejected to the ejection tray 17 by the ejection roller 16.

In a case of performing double-side printing on the printing medium, the printing medium is expanded or contracted due to the influence of heat and the like applied by the fixing device 10 to fix the toner image to the first surface, so that the size of the printing medium is different between a time of printing the first surface and a time of printing the second surface. Accordingly, the image forming apparatus 1 according to the first embodiment has a function of detecting each size of the printing medium before printing the first surface and before printing the second surface to calculate the ratio of expansion or contraction, and correcting magnification of the image to be printed on the second surface depending on the ratio of expansion or contraction.

Figure 2:
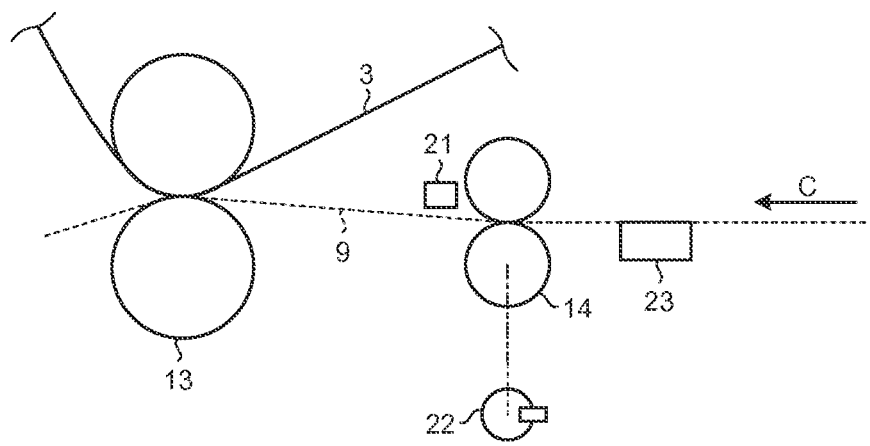
FIG. 2 is a diagram for explaining a mechanism for detecting a size of a printing medium.

FIG. 2 is a diagram for explaining a mechanism for detecting the size of the printing medium. As illustrated in FIG. 2, in the image forming apparatus 1 according to the first embodiment, a medium sensor 21 for detecting an end of the printing medium in a sub-scanning direction (length direction) corresponding to the conveying direction is arranged at a position near the registration roller 14 and downstream from the registration roller 14 in the conveyance path 9. An encoder 22 for measuring a rotation amount of the registration roller 14 is connected to the registration roller 14. A contact image sensor (CIS) 23 for detecting the size of the printing medium in a main scanning direction (width direction) corresponding to a direction orthogonal to the conveying direction is arranged upstream of the registration roller 14 in the conveyance path 9.

For example, the size of the printing medium in the sub-scanning direction can be obtained from the rotation amount of the registration roller 14 measured by the encoder 22 in a period of time from when a front end of the printing medium conveyed to the secondary transfer position by the rotation of the registration roller 14 is detected by the medium sensor 21 until the rear end thereof is detected. The method of detecting the size of the printing medium in the sub-scanning direction is described in detail in Japanese Laid-open Patent Publication No. 2013-107774, for example, and can be utilized for the image forming apparatus 1 according to the first embodiment.

Figure 3:
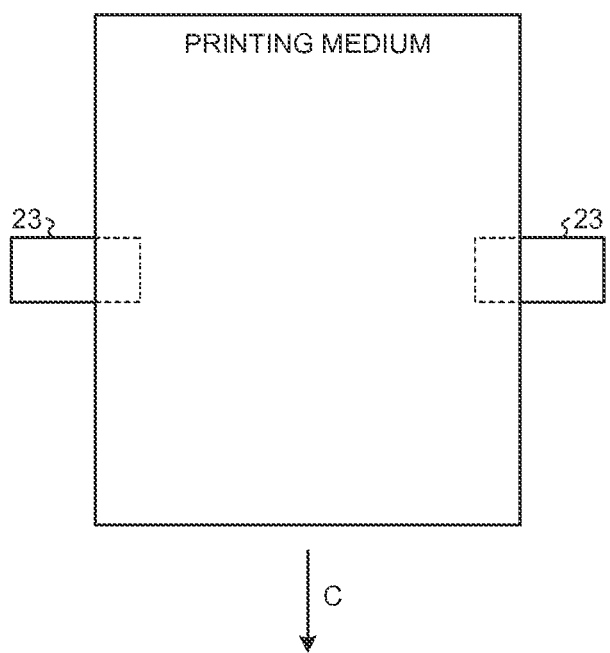
FIG. 3 is a diagram illustrating a state in which a contact image sensor (CIS) detects the size of the printing medium in a main scanning direction.

The size of the printing medium in the main scanning direction can be obtained by detecting positions of both ends of the printing medium in the main scanning direction by the CIS 23, and converting a difference between the positions of both ends to a distance. FIG. 3 is a diagram illustrating a state in which the CIS 23 detects the size of the printing medium in the main scanning direction, viewed in a direction perpendicular to a sheet surface of the printing medium. As illustrated in FIG. 3, for example, two CISs 23 are arranged at a predetermined distance in a direction orthogonal to the conveying direction (C direction in FIG. 3) of the printing medium. The configuration is such that one of the CISs 23 detects a position of one end of the printing medium in the main scanning direction, and the other one of the CISs 23 detects a position of the other end of the printing medium in the main scanning direction. An arrangement position and the size of the two CISs 23 are determined to be adaptable to the printing media of all sizes supported by the image forming apparatus 1. The size of the printing medium in the main scanning direction can be obtained by converting a difference between the positions detected by the two CISs 23 to a distance. In the example of FIG. 3, the two CISs 23 detect the positions of both ends of the printing medium in the main scanning direction.

Alternatively, of course, the positions of both ends of the printing medium in the main scanning direction may be detected by a long-length CIS 23 arranged along a direction orthogonal to the conveying direction of the printing medium.

Figure 4:
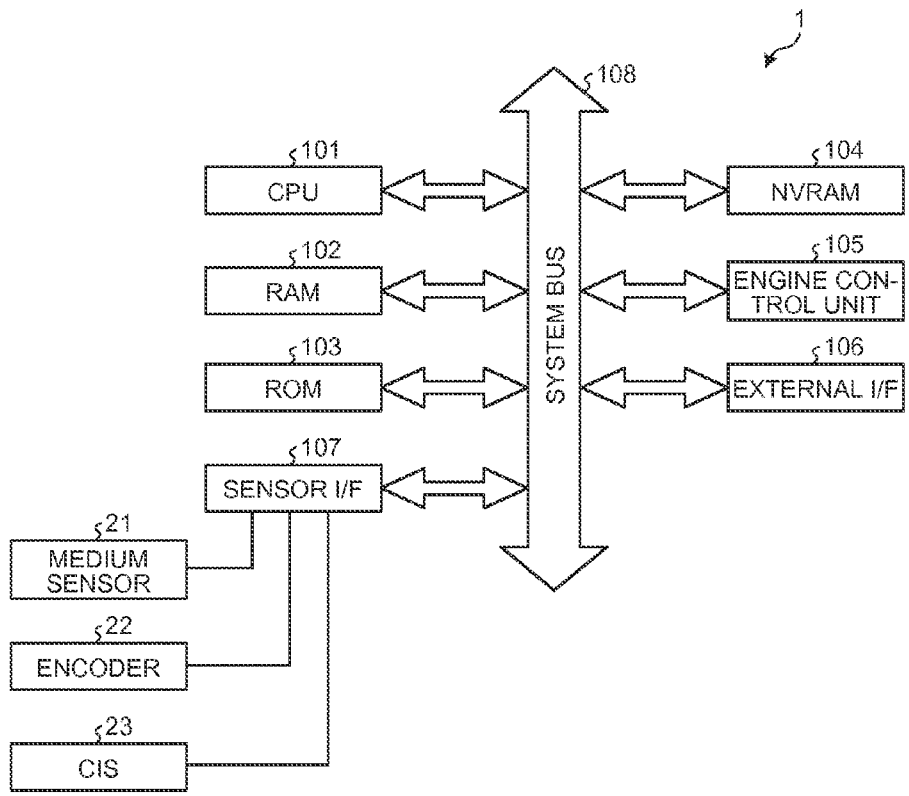
FIG. 4 is a block diagram illustrating an exemplary hardware configuration of a control system of the image forming apparatus.

FIG. 4 is a block diagram illustrating an exemplary hardware configuration of a control system of the image forming apparatus 1 according to the first embodiment. The image forming apparatus 1 according to the first embodiment includes, as illustrated in FIG. 4, a CPU 101, a RAM 102, a ROM 103, an NVRAM 104, an engine control unit 105, an external I/F 106, and a sensor I/F 107, which are connected to each other via a system bus 108. The sensor I/F 107 is connected to the medium sensor 21, the encoder 22, and the CIS 23.

The CPU 101 utilizes the RAM 102 as a main memory, a work area, and the like, and reads out and executes a computer program stored in the ROM 103, for example, to integrally control various operations in the image forming apparatus 1. For example, the CPU 101 performs control such as receiving image data from an external device (not illustrated) such as a host computer via the external I/F 106, and instructing formation of an image by passing the image data to the engine control unit 105. The CPU 101 can fetch necessary information from each of the medium sensor 21, the encoder 22, and the CIS 23 via the sensor I/F 107.

The NVRAM 104 is a non-volatile storage unit, and stores various pieces of information utilized by the computer program. Specifically, in the first embodiment, the NVRAM 104 has a function of updating and holding a value of the ratio of expansion or contraction described later.

The engine control unit 105 controls the operation of each component described above (refer to FIG. 1) related to image formation according to the instruction from the CPU 101, and forms an image corresponding to the image data on the printing medium.

In the image forming apparatus 1 according to the first embodiment, for example, the ROM 103 stores a computer program for correcting magnification of an image to be printed on the second surface in the double-side printing described above. When the CPU 101 reads out and executes the computer program, a functional configuration as illustrated in FIG. 5 is made in the image forming apparatus 1.

Figure 5:
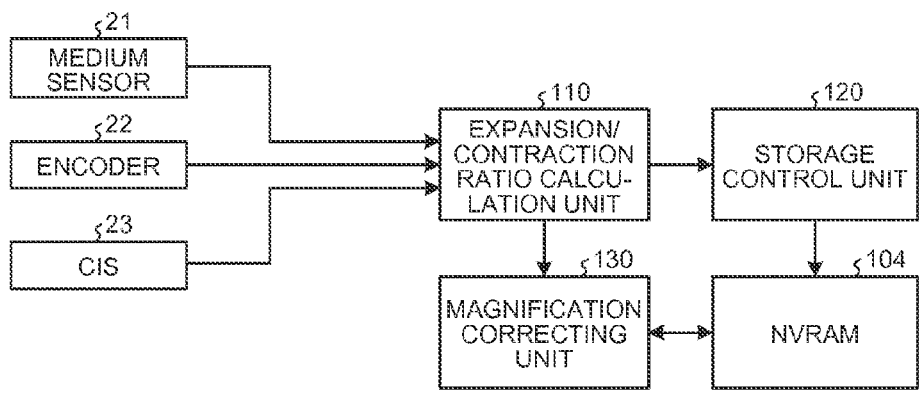
FIG. 5 is a block diagram illustrating an exemplary functional configuration related to magnification correction.

FIG. 5 is a block diagram illustrating an exemplary functional configuration made in the image forming apparatus 1 when the CPU 101 executes the computer program. In the image forming apparatus 1, as illustrated in FIG. 5, functional components related to magnification correction are made such as an expansion/contraction ratio calculation unit 110, a storage control unit 120, and a magnification correcting unit 130.

Based on the information fetched from each of the medium sensor 21, the encoder 22, and the CIS 23, the expansion/contraction ratio calculation unit 110 performs processing for calculating the value of the ratio of expansion or contraction of the printing medium at the time of printing the second surface as compared with the time of printing the first surface.

The ratio of expansion or contraction of the printing medium is an indicator that represents a degree of expansion or contraction of the printing medium at the time of printing the second surface as compared with the time of printing the first surface depending on a type of the printing medium or a temperature of the image forming apparatus 1 at that point. The ratio of expansion or contraction is obtained such that a difference between the size of the printing medium detected before the toner image is transferred and fixed to the first surface and the size of the printing medium detected before the toner image is transferred and fixed to the second surface is divided by the size of the printing medium detected before the toner image is transferred and fixed to the first surface, for example.

The expansion/contraction ratio calculation unit 110 according to the first embodiment calculates, as the value of the ratio of expansion or contraction at that point, an average value (moving average) of the ratio of expansion or contraction of a predetermined number of (for example, four) printing media that are successively conveyed, not the ratio of expansion or contraction of only one printing medium. That is, when the ratio of expansion or contraction of a certain printing medium (hereinafter, referred to as an individual ratio of expansion or contraction) is individually obtained, the expansion/contraction ratio calculation unit 110 calculates, as the value of the ratio of expansion or contraction at that point, the average value of the individual ratio of expansion or contraction of the printing medium and each individual ratio of expansion or contraction obtained for each of three pieces of printed matter preceding the printing medium, for example. The expansion/contraction ratio calculation unit 110 calculates the value of the ratio of expansion or contraction as described above for each of the sub-scanning direction as the conveying direction of the printing medium and the main scanning direction as the direction orthogonal to the conveying direction of the printing medium.

The storage control unit 120 performs processing for updating the value of the ratio of expansion or contraction calculated by the expansion/contraction ratio calculation unit 110 every time a new value is calculated, and causing the NVRAM 104 to hold the value. Although the NVRAM 104 is used as the storage unit that holds the value of the ratio of expansion or contraction calculated by the expansion/contraction ratio calculation unit 110 in the first embodiment, another memory device may be used. Note that a non-volatile memory device is preferably used to be able to hold the value of the ratio of expansion or contraction even when power supply is interrupted.

The magnification correcting unit 130 corrects the magnification of the image to be printed on the second surface of the printing medium at the point corresponding to whether or not a difference between the value of the ratio of expansion or contraction newly calculated by the expansion/contraction ratio calculation unit 110 and the value that has been held by the NVRAM 104 until the new value is calculated is within a predetermined range. That is, when the expansion/contraction ratio calculation unit 110 newly calculates the value of the ratio of expansion or contraction, the magnification correcting unit 130 reads out the value held by the NVRAM 104 at that point. The magnification correcting unit 130 then obtains a difference between the newly calculated value of the ratio of expansion or contraction and the value of the ratio of expansion or contraction read out from the NVRAM 104, and determines whether or not the difference is within the predetermined range. If the difference is within the predetermined range, the magnification correcting unit 130 corrects the magnification of the image to be printed on the second surface of the printing medium at that point by using the value of the ratio of expansion or contraction newly calculated by the expansion/contraction ratio calculation unit 110. On the other hand, if the difference exceeds the predetermined range, the magnification correcting unit 130 corrects the magnification of the image to be printed on the second surface of the printing medium at that point by using a value closer to 0 (an absolute value that is smaller) than the value of the ratio of expansion or contraction newly calculated by the expansion/contraction ratio calculation unit 110, for example, a half value of the newly calculated value of the ratio of expansion or contraction.

In the related art, as described above, if the difference between the newly calculated value of the ratio of expansion or contraction and the value held by the storage unit exceeds the predetermined range, the newly calculated value of the ratio of expansion or contraction is discarded, and the magnification is corrected by using the value held by the storage unit. Due to this, in the related art, a representative value of the ratio of expansion or contraction that is estimated corresponding to the type of the printing medium needs to be set in advance as an initial value in the storage unit. That is, in the related art, when the processing is started in a state where the initial value is not set in the storage unit (in a state where the value held by the storage unit is 0), the difference between the calculated value of the ratio of expansion or contraction and the value held by the storage unit exceeds the predetermined range, so that the calculated value of the ratio of expansion or contraction will be continuously discarded and the magnification of the image to be printed on the second surface of the printing medium cannot be corrected.

In contrast, in the first embodiment, even if the difference exceeds the predetermined range, the newly calculated value of the ratio of expansion or contraction is held by the NVRAM 104, and the magnification of the image to be printed on the second surface of the printing medium is corrected by using a value closer to 0 than the newly calculated value of the ratio of expansion or contraction (for example, a half value thereof). Accordingly, in the first embodiment, the magnification of the image to be printed on the second surface of the printing medium can be appropriately corrected without setting the initial value in the NVRAM 104 in advance. Additionally, when the difference exceeds the predetermined range, the magnification is corrected by using a value closer to 0 than the newly calculated value of the ratio of expansion or contraction (for example, a half value thereof), so that the size of the image the magnification of which is corrected gradually comes close to a target size, which effectively prevents the problem that variation in image size is noticeable among the printing media that are successively printed.

The magnification correction of the image using the value of the ratio of expansion or contraction is processing of adjusting the size of the electrostatic latent image (an irradiation range of the writing light) on the photoconductor drum 6 formed when the exposure unit 5 illustrated in FIG. 1 emits the writing light corresponding to the value of the ratio of expansion or contraction. That is, when the value of the ratio of expansion or contraction is positive, interpolation dots are discretely added to the irradiation range of the writing light corresponding to the image data so that the size of the electrostatic latent image is increased by an expansion amount of the printing medium. When the value of the ratio of expansion or contraction is negative, dots are discretely thinned from the irradiation range of the writing light corresponding to the image data so that the size of the electrostatic latent image is reduced by a contraction amount of the printing medium. At the time of printing the second surface in double-side printing, the printing medium is normally contracted, so that processing of discretely thinning dots is mainly performed. Such processing is carried out by the engine control unit 105 (refer to FIG. 4) that controls the operation of the exposure unit 5 in response to a command from the magnification correcting unit 130. The magnification correction of the image using the value of the ratio of expansion or contraction is not performed on the image to be printed on the second surface of the printing medium the size of which is detected in calculating the value of the ratio of expansion or contraction, and is performed on an image to be exposed after the value of the ratio of expansion or contraction is calculated (for example, an image to be printed on the second surface of any of the fifth to the eighth printing media). As described above, the magnification correction of the image using the value of the ratio of expansion or contraction is different from image processing that processes the image data itself (image scaling processing).

With reference to FIGS. 6 and 7, the following describes a specific example of processing related to the magnification correction according to the first embodiment by exemplifying specific numerical values. Although the calculation of the value of the ratio of expansion or contraction and the magnification correction in the sub-scanning direction of the printing medium are carried out at the same time as the calculation of the value of the ratio of expansion or contraction and the magnification correction in the main scanning direction of the printing medium, the following describes the processing in the sub-scanning direction and the processing in the main scanning direction separately for convenience. In the following description, a predetermined range used in determining the difference is assumed to be ±0.05 for both of the sub-scanning direction and the main scanning direction. This value is empirically obtained according to a purpose of the first embodiment, but is not limited thereto. In the following description, the value of the ratio of expansion or contraction of the printing medium calculated by the expansion/contraction ratio calculation unit 110 is assumed to be a moving average of individual ratios of expansion or contraction of four printing media, but is not limited thereto.

First, the following describes the processing in the sub-scanning direction of the printing medium with reference to FIG. 6. FIG. 6 is a diagram for explaining a relation between the ratio of expansion or contraction of the printing medium in the sub-scanning direction and the magnification correction.

As illustrated in FIG. 6, individual ratios of expansion or contraction in the sub-scanning direction calculated for the first to the seventh printing media are assumed to be −0.0962, −0.1634, −0.1250, −0.1009, −0.1297, −0.1009, and −0.1250, respectively. The expansion/contraction ratio calculation unit 110 calculates the moving average of the individual ratios of expansion or contraction of four printing media, so that the magnification of the image is not corrected until the individual ratio of expansion or contraction of the fourth printing medium is obtained, and the value held by the NVRAM 104 is 0.

When the individual ratio of expansion or contraction in the sub-scanning direction of the fourth printing medium is obtained, the expansion/contraction ratio calculation unit 110 calculates an average value of the individual ratios of expansion or contraction of the first to the fourth printing media as a value of the ratio of expansion or contraction in the sub-scanning direction of the printing medium at this point. In this case, a value of −0.1214 is calculated. This value is stored in the NVRAM 104 by the storage control unit 120, and held by the NVRAM 104 until the next value is calculated. The magnification correcting unit 130 determines whether or not a difference between the value of −0.1214 calculated by the expansion/contraction ratio calculation unit 110 and the value of 0 that has been held by the NVRAM 104 until the value of −0.1214 is calculated is within the predetermined range. In this case, the difference is −0.1214, which exceeds the predetermined range of ±0.05, so that the magnification correcting unit 130 uses a value of −0.0607, which is a half value of the value of −0.1214 calculated by the expansion/contraction ratio calculation unit 110, to correct the magnification in the sub-scanning direction of the image to be printed on the second surface of the printing medium.

Next, when the individual ratio of expansion or contraction in the sub-scanning direction of the fifth printing medium is obtained, the expansion/contraction ratio calculation unit 110 calculates an average value of the individual ratios of expansion or contraction of the second to fifth printing media as the value of the ratio of expansion or contraction in the sub-scanning direction of the printing medium at this point. In this case, a value of −0.1298 is calculated. This value is stored in the NVRAM 104 by the storage control unit 120, and held by the NVRAM 104 until the next value is calculated. The magnification correcting unit 130 determines whether or not a difference between the value of −0.1298 calculated by the expansion/contraction ratio calculation unit 110 and the value of −0.1214 that has been held by the NVRAM 104 until the value of −0.1298 is calculated is within the predetermined range. In this case, the difference is −0.0084, which is within the predetermined range of ±0.05, so that the magnification correcting unit 130 uses the value of −0.1298 calculated by the expansion/contraction ratio calculation unit 110 to correct the magnification in the sub-scanning direction of the image to be printed on the second surface of the printing medium.

Next, when the individual ratio of expansion or contraction in the sub-scanning direction of the sixth printing medium is obtained, the expansion/contraction ratio calculation unit 110 calculates an average value of the individual ratios of expansion or contraction of the third to sixth printing media as the value of the ratio of expansion or contraction in the sub-scanning direction of the printing medium at this point. In this case, a value of −0.1141 is calculated. This value is stored in the NVRAM 104 by the storage control unit 120, and held by the NVRAM 104 until the next value is calculated. The magnification correcting unit 130 determines whether or not a difference between the value of −0.1141 calculated by the expansion/contraction ratio calculation unit 110 and the value of −0.1298 that has been held by the NVRAM 104 until the value of −0.1141 is calculated is within the predetermined range. In this case, the difference is +0.0157, which is within the predetermined range of ±0.05, so that the magnification correcting unit 130 uses the value of −0.1141 calculated by the expansion/contraction ratio calculation unit 110 to correct the magnification in the sub-scanning direction of the image to be printed on the second surface of the printing medium.

Next, when the individual ratio of expansion or contraction in the sub-scanning direction of the seventh printing medium is obtained, the expansion/contraction ratio calculation unit 110 calculates an average value of the individual ratios of expansion or contraction of the fourth to seventh printing media as the value of the ratio of expansion or contraction in the sub-scanning direction of the printing medium at this point. In this case, a value of −0.1141 is calculated. This value is stored in the NVRAM 104 by the storage control unit 120, and held by the NVRAM 104 until the next value is calculated. The magnification correcting unit 130 determines whether or not a difference between the value of −0.1141 calculated by the expansion/contraction ratio calculation unit 110 and the value of −0.1141 that has been held by the NVRAM 104 until the value of −0.1141 is calculated is within the predetermined range. In this case, the difference is 0, which is within the predetermined range of ±0.05, so that the magnification correcting unit 130 uses the value of −0.1141 calculated by the expansion/contraction ratio calculation unit 110 to correct the magnification in the sub-scanning direction of the image to be printed on the second surface of the printing medium.

Thereafter, every time the individual ratio of expansion or contraction in the sub-scanning direction is obtained for each of subsequent printing media, the same processing will be repeated.

Next, the following describes processing in the main scanning direction of the printing medium with reference to FIG. 7. FIG. 7 is a diagram for explaining a relation between the ratio of expansion or contraction of the printing medium in the main scanning direction and the magnification correction.

As illustrated in FIG. 7, individual ratios of expansion or contraction in the main scanning direction calculated for the first to the seventh printing media are assumed to be −0.1518, −0.1519, −0.1140, −0.1519, −0.1234, −0.1423, and −0.1234, respectively. The expansion/contraction ratio calculation unit 110 calculates the moving average of the individual ratios of expansion or contraction of four printing media, so that the magnification of the image is not corrected until the individual ratio of expansion or contraction of the fourth printing medium is obtained, and the value held by the NVRAM 104 is 0.

When the individual ratio of expansion or contraction in the main scanning direction of the fourth printing medium is obtained, the expansion/contraction ratio calculation unit 110 calculates an average value of the individual ratios of expansion or contraction of the first to the fourth printing media as the value of the ratio of expansion or contraction in the main scanning direction of the printing medium at this point. In this case, a value of −0.1424 is calculated. This value is stored in the NVRAM 104 by the storage control unit 120, and held by the NVRAM 104 until the next value is calculated. The magnification correcting unit 130 determines whether or not a difference between the value of −0.1424 calculated by the expansion/contraction ratio calculation unit 110 and the value of 0 that has been held by the NVRAM 104 until the value of −0.1424 is calculated is within the predetermined range. In this case, the difference is −0.1424, which exceeds the predetermined range of ±0.05, so that the magnification correcting unit 130 uses a value of −0.0712, which is a half value of the value of −0.1424 calculated by the expansion/contraction ratio calculation unit 110, to correct the magnification in the main scanning direction of the image to be printed on the second surface of the printing medium.

Next, when the individual ratio of expansion or contraction in the main scanning direction of the fifth printing medium is obtained, the expansion/contraction ratio calculation unit 110 calculates an average value of the individual ratios of expansion or contraction of the second to fifth printing media as the value of the ratio of expansion or contraction in the main scanning direction of the printing medium at this point. In this case, a value of −0.1353 is calculated. This value is stored in the NVRAM 104 by the storage control unit 120, and held by the NVRAM 104 until the next value is calculated. The magnification correcting unit 130 determines whether or not a difference between the value of −0.1353 calculated by the expansion/contraction ratio calculation unit 110 and the value of −0.1424 that has been held by the NVRAM 104 until the value of −0.1353 is calculated is within the predetermined range. In this case, the difference is +0.0071, which is within the predetermined range of ±0.05, so that the magnification correcting unit 130 uses the value of −0.1353 calculated by the expansion/contraction ratio calculation unit 110 to correct the magnification in the main scanning direction of the image to be printed on the second surface of the printing medium.

Next, when the individual ratio of expansion or contraction in the main scanning direction of the sixth printing medium is obtained, the expansion/contraction ratio calculation unit 110 calculates an average value of the individual ratios of expansion or contraction of the third to sixth printing media as the value of the ratio of expansion or contraction in the main scanning direction of the printing medium at this point. In this case, a value of −0.1329 is calculated. This value is stored in the NVRAM 104 by the storage control unit 120, and held by the NVRAM 104 until the next value is calculated. The magnification correcting unit 130 determines whether or not a difference between the value of −0.1329 calculated by the expansion/contraction ratio calculation unit 110 and the value of −0.1353 that has been held by the NVRAM 104 until the value of −0.1329 is calculated is within the predetermined range. In this case, the difference is +0.0024, which is within the predetermined range of ±0.05, so that the magnification correcting unit 130 uses the value of −0.1329 calculated by the expansion/contraction ratio calculation unit 110 to correct the magnification in the main scanning direction of the image to be printed on the second surface of the printing medium.

Next, when the individual ratio of expansion or contraction in the main scanning direction of the seventh printing medium is obtained, the expansion/contraction ratio calculation unit 110 calculates an average value of the individual ratios of expansion or contraction of the fourth to seventh printing media as the value of the ratio of expansion or contraction in the main scanning direction of the printing medium at this point. In this case, a value of −0.1353 is calculated. This value is stored in the NVRAM 104 by the storage control unit 120, and held by the NVRAM 104 until the next value is calculated. The magnification correcting unit 130 determines whether or not a difference between the value of −0.1353 calculated by the expansion/contraction ratio calculation unit 110 and the value of −0.1329 that has been held by the NVRAM 104 until the value of −0.1353 is calculated is within the predetermined range. In this case, the difference is −0.0024, which is within the predetermined range of ±0.05, so that the magnification correcting unit 130 uses the value of −0.1353 calculated by the expansion/contraction ratio calculation unit 110 to correct the magnification in the main scanning direction of the image to be printed on the second surface of the printing medium.

Thereafter, every time the individual ratio of expansion or contraction in the main scanning direction is obtained for each of subsequent printing media, the same processing will be repeated.

In the above description, the magnification correction is not performed until the moving average of individual ratios of expansion or contraction of a predetermined number of (for example, four) printing media is calculated. Alternatively, the magnification correction may be performed using the value of the individual ratio of expansion or contraction until the moving average of individual ratios of expansion or contraction of the predetermined number of printing media is calculated.

For example, in the example illustrated in FIG. 6, when the individual ratio of expansion or contraction in the sub-scanning direction of the first printing medium is calculated to be −0.0962, the magnification correcting unit 130 determines whether or not a difference between the value of −0.0962 as the individual ratio of expansion or contraction and the value of 0 that has been held by the NVRAM 104 until the value of −0.0962 is calculated is within the predetermined range. In this case, the difference is −0.0962, which exceeds the predetermined range of ±0.05, so that the magnification correcting unit 130 uses a half value of the value of −0.0962 as the individual ratio of expansion or contraction, that is, a value of −0.0481, to correct the magnification in the sub-scanning direction of the image to be printed on the second surface of the printing medium. The value of −0.0962 as the individual ratio of expansion or contraction at this point is stored in the NVRAM 104 by the storage control unit 120.

Next, when the individual ratio of expansion or contraction in the sub-scanning direction of the second printing medium is calculated to be −0.1634, the magnification correcting unit 130 determines whether or not a difference between the value of −0.1634 as the individual ratio of expansion or contraction and the value of −0.0962 that has been held by the NVRAM 104 until the value of −0.1634 is calculated is within the predetermined range. In this case, the difference is −0.0672, which exceeds the predetermined range of ±0.05, so that the magnification correcting unit 130 uses a half value of the value of −0.1634 as the individual ratio of expansion or contraction, that is, a value of −0.0817, to correct the magnification in the sub-scanning direction of the image to be printed on the second surface of the printing medium. The value of −0.1634 as the individual ratio of expansion or contraction at this point is stored in the NVRAM 104 by the storage control unit 120.

Next, when the individual ratio of expansion or contraction in the sub-scanning direction of the third printing medium is calculated to be −0.1250, the magnification correcting unit 130 determines whether or not a difference between the value of −0.1250 as the individual ratio of expansion or contraction and the value of −0.1634 that has been held by the NVRAM 104 until the value of −0.1250 is calculated is within the predetermined range. In this case, the difference is +0.0384, which is within the predetermined range of ±0.05, so that the magnification correcting unit 130 uses the value of −0.1250 as the individual ratio of expansion or contraction to correct the magnification in the sub-scanning direction of the image to be printed on the second surface of the printing medium. The value of −0.1250 as the individual ratio of expansion or contraction at this point is stored in the NVRAM 104 by the storage control unit 120.

Next, when the individual ratio of expansion or contraction in the sub-scanning direction of the fourth printing medium is obtained, similarly to the example described above, the average value of the individual ratios of expansion or contraction of the first to the fourth printing media is calculated to be −0.1214. The magnification correcting unit 130 then determines whether or not a difference between the value of −0.1214 and the value of −0.1250 that has been held by the NVRAM 104 until the value of −0.1214 is calculated is within the predetermined range. In this case, the difference is +0.0036, which is within the predetermined range of ±0.05, so that the magnification correcting unit 130 uses the average value of −0.1214 to correct the magnification in the sub-scanning direction of the image to be printed on the second surface of the printing medium. The value of −0.1214 calculated at this point is stored in the NVRAM 104 by the storage control unit 120. Subsequently, the same processing as described above will be performed.

In the example illustrated in FIG. 7, when the individual ratio of expansion or contraction in the main scanning direction of the first printing medium is calculated to be −0.1518, the magnification correcting unit 130 determines whether or not a difference between the value of −0.1518 as the individual ratio of expansion or contraction and the value of 0 that has been held by the NVRAM 104 until the value of −0.1518 is calculated is within the predetermined range. In this case, the difference is −0.1518, which exceeds the predetermined range of ±0.05, so that the magnification correcting unit 130 uses a half value of the value of −0.1518 as the individual ratio of expansion or contraction, that is, a value of −0.0759, to correct the magnification in the main scanning direction of the image to be printed on the second surface of the printing medium. The value of −0.1518 as the individual ratio of expansion or contraction at this point is stored in the NVRAM 104 by the storage control unit 120.

Next, when the individual ratio of expansion or contraction in the main scanning direction of the second printing medium is calculated to be −0.1519, the magnification correcting unit 130 determines whether or not a difference between the value of −0.1519 as the individual ratio of expansion or contraction and the value of −0.1518 that has been held by the NVRAM 104 until the value of −0.1519 is calculated is within the predetermined range. In this case, the difference is −0.0001, which is within the predetermined range of ±0.05, so that the magnification correcting unit 130 uses the value of −0.1519 as the individual ratio of expansion or contraction to correct the magnification in the main scanning direction of the image to be printed on the second surface of the printing medium. The value of −0.1519 as the individual ratio of expansion or contraction at this point is stored in the NVRAM 104 by the storage control unit 120.

Next, when the individual ratio of expansion or contraction in the main scanning direction of the third printing medium is calculated to be −0.1140, the magnification correcting unit 130 determines whether or not a difference between the value of −0.1140 as the individual ratio of expansion or contraction and the value of −0.1519 that has been held by the NVRAM 104 until the value of −0.1140 is calculated is within the predetermined range. In this case, the difference is +0.0379, which is within the predetermined range of ±0.05, so that the magnification correcting unit 130 uses the value of −0.1140 as the individual ratio of expansion or contraction to correct the magnification in the main scanning direction of the image to be printed on the second surface of the printing medium. The value of −0.1140 as the individual ratio of expansion or contraction at this point is stored in the NVRAM 104 by the storage control unit 120.

Next, when the individual ratio of expansion or contraction in the main scanning direction of the fourth printing medium is obtained, similarly to the example described above, the average value of the individual ratios of expansion or contraction of the first to the fourth printing media is calculated to be −0.1424. The magnification correcting unit 130 then determines whether or not a difference between the value of −0.1424 and the value of −0.1140 that has been held by the NVRAM 104 until the value of −0.1424 is calculated is within the predetermined range. In this case, the difference is −0.0284, which is within the predetermined range of ±0.05, so that the magnification correcting unit 130 uses the average value of −0.1424 to correct the magnification in the main scanning direction of the image to be printed on the second surface of the printing medium. The value of −0.1424 calculated at this point is stored in the NVRAM 104 by the storage control unit 120. Subsequently, the same processing as described above will be performed.

With such a configuration of calculating the average value (moving average) of the individual ratios of expansion or contraction of a predetermined number of printing media as the value of the ratio of expansion or contraction of the printing medium, influence of temporary erroneous detection of the size of the printing medium can be prevented. However, with a configuration in which the magnification correction is not performed until the moving average is calculated, a time during which the magnification correction cannot be performed is disadvantageously prolonged. In contrast, with a configuration in which the magnification correction is performed by using the individual ratio of expansion or contraction until the moving average is calculated, such a disadvantage can be effectively avoided.

Next, with reference to FIG. 8, the following describes a procedure of processing related to the magnification correction according to the first embodiment. FIG. 8 is a flowchart illustrating an example of a processing procedure related to the magnification correction. The flowchart of FIG. 8 illustrates a processing procedure performed for each printing medium conveyed along the conveyance path 9. When a plurality of printing media are successively conveyed, pieces of processing corresponding to respective printing media are performed in parallel. Hereinafter, the following describes processing for the sub-scanning direction of the printing medium and processing for the main scanning direction thereof without discriminating one from another.

First, based on the information fetched from each of the medium sensor 21, the encoder 22, and the CIS 23, the size of the first surface is detected at the time of printing the first surface of the printing medium (Step S101), and the size of the second surface is then detected at the time of printing the second surface of the printing medium (Step S102).

Next, the expansion/contraction ratio calculation unit 110 calculates the individual ratio of expansion or contraction of the printing medium based on the size of the first surface detected at Step S101 and the size of the second surface detected at Step S102 (Step S103).

The expansion/contraction ratio calculation unit 110 then determines whether or not the individual ratios of expansion or contraction of a predetermined number of (for example, four) printing media are calculated (Step S104). If the individual ratios of expansion or contraction of the predetermined number of printing media are not calculated (No at Step S104), the moving average of the predetermined number of printing media cannot be calculated, so that the processing is ended as it is. On the other hand, if the individual ratios of expansion or contraction of the predetermined number of printing media are calculated (Yes at Step S104), the expansion/contraction ratio calculation unit 110 calculates an average value (moving average) of the individual ratios of expansion or contraction of the predetermined number of printing media as a value of the ratio of expansion or contraction at that point (Step S105).

Subsequently, the magnification correcting unit 130 reads out the value of the ratio of expansion or contraction held by the NVRAM 104 (Step S106). The magnification correcting unit 130 then calculates a difference between the value of the ratio of expansion or contraction calculated at Step S105 and the value of the ratio of expansion or contraction read out from the NVRAM 104 at Step S106 (Step S107).

The magnification correcting unit 130 then determines whether or not the difference calculated at Step S107 is within a predetermined range (for example, ±0.05) (Step S108). If the difference is within the predetermined range (Yes at Step S108), the magnification correcting unit 130 uses the value of the ratio of expansion or contraction calculated at Step S105 to correct the magnification of the image to be printed on the second surface of the printing medium (Step S109). On the other hand, if the difference exceeds the predetermined range (No at Step S108), the magnification correcting unit 130 uses a half value of the value of the ratio of expansion or contraction calculated at Step S105 to correct the magnification of the image to be printed on the second surface of the printing medium (Step S110).

Thereafter, the storage control unit 120 stores the value of the ratio of expansion or contraction calculated at Step S105 in the NVRAM 104 (Step S111), and a series of processing is ended.

As described above with specific examples, in the first embodiment, even when the difference between the newly calculated value of the ratio of expansion or contraction and the value that has been held by the NVRAM 104 until the new value is calculated exceeds the predetermined range, the NVRAM 104 is caused to hold the newly calculated value of the ratio of expansion or contraction. When the difference is within the predetermined range, the newly calculated value of the ratio of expansion or contraction is used to correct the magnification of the image to be printed on the second surface. When the difference exceeds the predetermined range, a value closer to 0 than the newly calculated value of the ratio of expansion or contraction (for example, a half value thereof) is used to correct the magnification of the image to be printed on the second surface. Accordingly, in the first embodiment, the magnification of the image to be printed on the second surface of the printing medium can be appropriately corrected without setting the initial value in the NVRAM 104 in advance. Additionally, when the difference exceeds the predetermined range, the magnification is corrected by using a value closer to 0 than the newly calculated value of the ratio of expansion or contraction (for example, a half value thereof), so that the size of the image the magnification of which is corrected gradually comes close to a target size, which effectively prevents the problem that variation in image size is noticeable among the printing media that are successively printed.

As described above, the functional components of the image forming apparatus 1 illustrated in FIG. 5 can be made when the CPU 101 (processor) executes a predetermined computer program, for example. In this case, the computer program can be embedded and provided in the ROM 103, for example. The computer program may be recorded and provided in a non-transitory computer-readable recording medium such as a CD-ROM, a flexible disk (FD), a CD-R, and a digital versatile disc (DVD) as a file that can be installed in the image forming apparatus 1 or executed by the image forming apparatus 1.

The computer program may be stored in a computer connected to a network such as the Internet and provided by being downloaded by the image forming apparatus 1 via the network. The computer program may be provided or distributed via a network such as the Internet.

The computer program has a module configuration including the expansion/contraction ratio calculation unit 110, the storage control unit 120, and the magnification correcting unit 130. As actual hardware, for example, the CPU 101 (processor) utilizes the RAM 102 as a main memory, a work area, and the like, and reads out the computer program from the ROM 103 and the like to be executed. Accordingly, the components described above are loaded onto the RAM 102 to be generated thereon.

Part or all of the components (the expansion/contraction ratio calculation unit 110, the storage control unit 120, and the magnification correcting unit 130) can be made using dedicated hardware such as an application specific integrated circuit (ASIC) and a field-programmable gate array (FPGA).

The first embodiment can be interpreted as follows. That is, the image forming apparatus 1 according to the first embodiment is an image forming apparatus that performs double-side printing, and includes the expansion/contraction ratio calculation unit 110, the storage control unit 120, and the magnification correcting unit 130. The expansion/contraction ratio calculation unit 110 calculates the value of the ratio of expansion or contraction of the printing medium at the time of printing the second surface as compared with the time of printing the first surface. The storage control unit 120 causes the NVRAM 104 to hold the calculated value of the ratio of expansion or contraction while updating the value every time a new value is calculated. The magnification correcting unit 130 corrects the magnification of the image to be printed on the second surface using the newly calculated value of the ratio of expansion or contraction when the difference between the newly calculated value of the ratio of expansion or contraction and the value that has been held by the NVRAM 104 until the new value is calculated is within the predetermined range, and corrects the magnification of the image to be printed on the second surface using a value closer to 0 than the newly calculated value of the ratio of expansion or contraction when the difference exceeds the predetermined range.

In the image forming apparatus 1 according to the first embodiment, when the difference exceeds the predetermined range, the magnification correcting unit 130 corrects the magnification of the image to be printed on the second surface using a half value of the newly calculated value of the ratio of expansion or contraction.

In the image forming apparatus 1 according to the first embodiment, the expansion/contraction ratio calculation unit 110 calculates an average value of ratios of expansion or contraction of a plurality of printing media that are successively conveyed as the value of the ratio of expansion or contraction.

Second Embodiment

Subsequently, the following describes a second embodiment of the present invention. In the second embodiment, when the difference between the newly calculated value of the ratio of expansion or contraction and the value that has been held by the NVRAM 104 until the new value is calculated exceeds the predetermined range, the magnification correcting unit 130 (hereinafter, referred to as a "magnification correcting unit 130'" in distinction from the first embodiment) sets the number of times of correction corresponding to magnitude of the difference, and repeatedly performs the magnification correction by the set number of times of correction using a value that equally comes close to the difference value every time the magnification correction is performed by the set number of times of correction. The basic configuration of the image forming apparatus 1 is the same as that in the first embodiment. Hereinafter, the same components as those in the first embodiment are denoted by the same reference numerals, and redundant description will not be repeated. Only characteristic parts of the second embodiment will be described.

Figure 9:
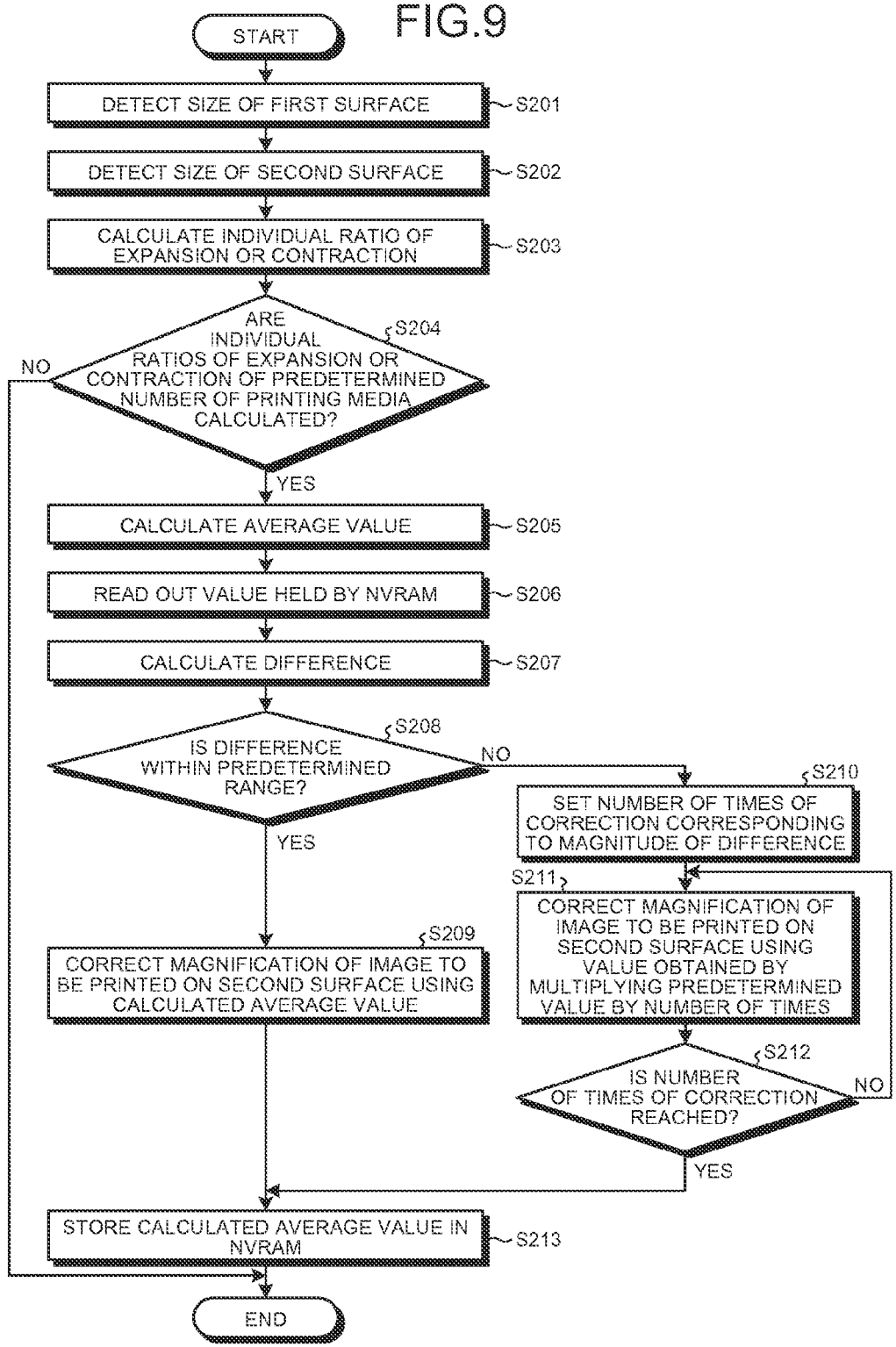
FIG. 9 is a flowchart illustrating an example of the processing procedure related to magnification correction according to a second embodiment of the present invention.

FIG. 9 is a flowchart illustrating an example of a processing procedure related to the magnification correction. In the flowchart of FIG. 9, processing at Steps S201 through S209 and Step S213 is the same as processing at Steps S101 through S109 and Step S111 illustrated in FIG. 8, so that the description thereof will not be repeated.

If the difference exceeds the predetermined range as a result of determination at Step S208 (No at Step S208), the magnification correcting unit 130' according to the second embodiment sets the number of times of correction corresponding to magnitude of the difference (Step S210). The number of times of correction is obtained, for example, by dividing a value corresponding to the difference by a predetermined value. Specifically, for example, when the difference value is −0.1 and the predetermined value is −0.03, the number of times of correction becomes 3. As the predetermined value, a value closer to 0 than the value defining the predetermined range (−0.05 in the above example) is set in advance.

Next, the magnification correcting unit 130' performs magnification correction by the number of times of correction set at Step S210. At this time, the magnification correcting unit 130' performs each process of magnification correction by using a value obtained by multiplying the predetermined value by the number of times (Step S211). For example, when the difference value is −0.1, the predetermined value is −0.03, and the number of times of correction is set to be 3, the magnification correcting unit 130' performs magnification correction using a value of −0.03 obtained by multiplying the predetermined value by 1 at the first time of correction, performs magnification correction using a value of −0.06 obtained by multiplying the predetermined value by 2 at the second time of correction, and performs magnification correction using a value of −0.09 obtained by multiplying the predetermined value by 3 at the third time of correction. In this way, the magnification correcting unit 130' repeatedly performs magnification correction by the number of times of correction set at Step S210 using the value that equally comes close to the difference value every time each process of magnification correction is performed.

While the above processing is performed, the magnification correcting unit 130' determines whether or not the number of times by which the magnification correction is performed reaches the number of times of correction set at Step S210 (Step S212). If the number of times of correction is not reached (No at Step S212), the process returns to Step S211 and the magnification correction is performed until the number of times of correction is reached. If the number of times of correction is then reached (Yes at Step S212), the storage control unit 120 stores the value of the ratio of expansion or contraction calculated at Step S205 in the NVRAM 104 (Step S213), and a series of processing is ended. The timing when the value of the ratio of expansion or contraction calculated at Step S205 is stored in the NVRAM 104 may be before the magnification correcting unit 130' performs magnification correction by the number of times of correction.

In the second embodiment, even when a value of the ratio of expansion or contraction is newly calculated based on a size detection result of a subsequent printing medium while the magnification correcting unit 130' performs magnification correction by the number of times of correction, the newly calculated value of the ratio of expansion or contraction is not used to perform magnification correction. The expansion/contraction ratio calculation unit 110 may be caused not to perform the processing of newly calculating the value of the ratio of expansion or contraction while the magnification correcting unit 130' performs magnification correction by the number of times of correction.

As described above, in the second embodiment, when the difference between the newly calculated value of the ratio of expansion or contraction and the value that has been held by the NVRAM 104 until the new value is calculated exceeds the predetermined range, magnification correction is performed by the number of times of correction corresponding to the difference using the value that equally comes close to the difference value every time the correction is performed. Accordingly, in the second embodiment, the size of the image the magnification of which is corrected can come close to a target size more smoothly, which further effectively prevents the problem that variation in image size is noticeable among the printing media that are successively printed.

The second embodiment can be interpreted as follows. That is, in the image forming apparatus 1 according to the second embodiment, the magnification correcting unit 130' sets the number of times of correction corresponding to magnitude of the difference when the difference exceeds the predetermined range, and repeatedly performs magnification correction by the set number of times of correction using the value that equally comes close to the difference value every time the magnification correction is performed by the set number of times of correction.

Third Embodiment

Subsequently, the following describes a third embodiment of the present invention. In the third embodiment, the storage control unit 120 (hereinafter, referred to as a "storage control unit 120'" in distinction from the first embodiment) causes the NVRAM 104 to hold the value of the ratio of expansion or contraction calculated by the expansion/contraction ratio calculation unit 110 for each of a plurality of trays of the sheet feeding table 8 (refer to FIG. 1), and the magnification correcting unit 130 (hereinafter, referred to as a "magnification correcting unit 130''" in distinction from the first embodiment and the second embodiment) reads out, from the NVRAM 104, the value of the ratio of expansion or contraction corresponding to a tray storing a printing medium that is being conveyed to calculate a difference. In the third embodiment, when any of the trays is opened, the storage control unit 120' deletes (resets) a value corresponding to the opened tray from among the values held by the NVRAM 104. The basic configuration of the image forming apparatus 1 is the same as that in the first embodiment. Hereinafter, the same components as those in the first embodiment are denoted by the same reference numerals, and redundant description will not be repeated. Only characteristic parts of the third embodiment will be described.

Figure 10:
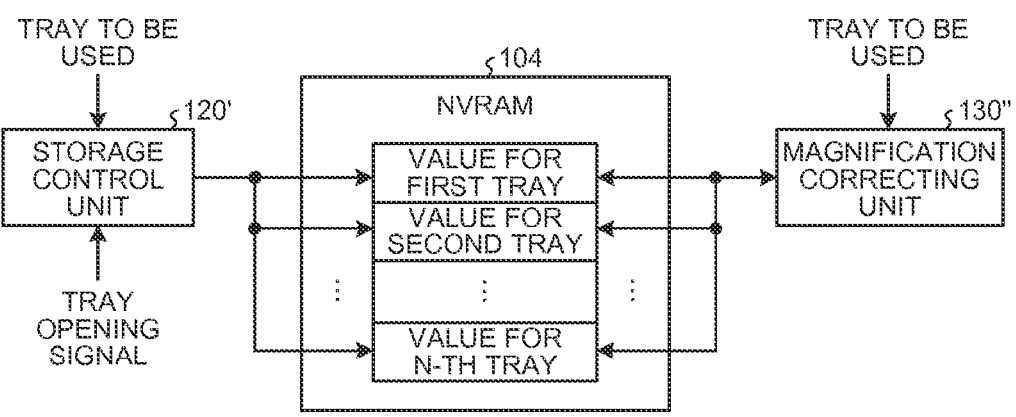
FIG. 10 is a diagram for explaining processing in a storage control unit and a magnification correcting unit according to a third embodiment of the present invention.

FIG. 10 is a diagram for explaining processing in the storage control unit 120' and the magnification correcting unit 130'' according to the third embodiment. When the image forming apparatus 1 includes N trays that store the printing media, as illustrated in FIG. 10, storage areas corresponding to respective N trays are secured in the NVRAM 104.

The storage control unit 120' according to the third embodiment determines a tray in which the printing medium that is being conveyed is stored from among the N trays based on information about a tray to be used that is designated corresponding to a print job, for example. When the ratio of expansion or contraction is newly calculated by the expansion/contraction ratio calculation unit 110, the storage control unit 120' writes the newly calculated value of the ratio of expansion or contraction into the storage area of the NVRAM 104 corresponding to the tray in which the printing medium that is being conveyed is stored, and updates the value in the storage area.

Similarly, the magnification correcting unit 130'' according to the third embodiment determines the tray in which the printing medium that is being conveyed is stored based on the information about the tray to be used that is designated corresponding to a print job, for example. When the value of the ratio of expansion or contraction is newly calculated by the expansion/contraction ratio calculation unit 110, the magnification correcting unit 130'' reads out a value before being updated with the newly calculated value of the ratio of expansion or contraction from the storage area of the NVRAM 104 corresponding to the tray in which the printing medium that is being conveyed is stored, and calculates a difference between the newly calculated value and the value before being updated. Accordingly, even when different types of printing media are stored in a plurality of trays, processing of magnification correction can be appropriately performed corresponding to a printing medium that is being conveyed, and the appropriate processing of magnification correction can be continuously performed even when the tray to be used is changed.

When detecting that any of the trays is opened based on information from a mechanism of detecting opening/closing of the tray (not illustrated), for example, the storage control unit 120' according to the third embodiment deletes the value held in a storage area corresponding to the opened tray from among the values held by the NVRAM 104. That is, the storage control unit 120' resets, to 0, the value corresponding to the opened tray among the values held by the NVRAM 104. This is because a printing medium to be newly set in the opened tray may be a different type from the printing medium that has been set before the tray is opened. In this way, even when a printing medium of different type is to be set in the opened tray, appropriate processing of magnification correction corresponding to the printing medium can be performed by deleting (resetting to 0) the value corresponding to the opened tray from among the values held by the NVRAM 104.

The third embodiment can be interpreted as follows. That is, the image forming apparatus 1 according to the third embodiment includes a plurality of trays storing printing media, the storage control unit 120' causes the NVRAM 104 to hold the calculated value of the ratio of expansion or contraction for each of the trays, and the magnification correcting unit 130'' reads out, from the NVRAM 104, the value corresponding to the tray storing the printing medium that is being conveyed to calculate the difference.

In the image forming apparatus 1 according to the third embodiment, when any of the trays is opened, the storage control unit 120' deletes the value corresponding to the opened tray from among the values held by the NVRAM 104.

In the above embodiments, for example, the image forming apparatus 1 that performs printing using the electrophotographic system is exemplified as an example of an image forming apparatus to which the present invention is applied. The present invention can also be effectively applied to another type of image forming apparatus such as an image forming apparatus that performs printing using an inkjet system. In a case of the image forming apparatus using the inkjet system, the printing medium may be contracted or expanded due to an effect of ink adhering to the first surface of the printing medium. The present invention is effective in performing magnification correction corresponding to such contraction or expansion of the printing medium.

In the above embodiments, the image forming apparatus 1 configured as a single apparatus is exemplified. For example, the present invention can also be effectively applied to an image forming apparatus (image forming system) configured by connecting a plurality of units such as a sheet feeding unit, a main body unit, and a postprocessing unit.

According to the embodiments of the present invention, magnification can be appropriately corrected corresponding to expansion or contraction of the printing medium without setting the initial value of the ratio of expansion or contraction corresponding to the type of the printing medium in the storage unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that performs double-side printing, the image forming apparatus comprising:
    an expansion/contraction ratio calculation unit that calculates a value of a ratio of expansion or contraction of a printing medium at a time of printing a second surface as compared with that at a time of printing a first surface;
    a storage control unit that causes a storage unit to hold the calculated value of the ratio of expansion or contraction while updating the value every time a new value is calculated; and
    a magnification correcting unit that obtains a difference between a newly calculated value of the ratio of expansion or contraction and a value that has been held b the storage unit until the new value is calculated, and determines whether or not the difference is within a predetermined range, corrects magnification of an image to be printed on the second surface using the newly calculated value of the ratio of expansion or contraction when the difference is within the predetermined range, and corrects the magnification of the image to be printed on the second surface using a different value than the newly calculated value of the ratio of expansion or contraction when the difference exceeds the predetermined range.

2. The image forming apparatus according to claim 1, wherein the magnification correcting unit corrects the magnification of the image to be printed on the second surface using a half value of the newly calculated value of the ratio of expansion or contraction when the difference exceeds the predetermined range.

3. The image forming apparatus according to claim 1, wherein the magnification correcting unit sets a number of times of correction corresponding to magnitude of the difference when the difference exceeds the predetermined range, and repeatedly performs magnification correction by the set number of times of correction using a value that equally comes close to the difference value every time the magnification correction is performed by the set number of times of correction.

4. The image forming apparatus according to claim 1, wherein the expansion/contraction ratio calculation unit calculates, as the value of the ratio of expansion or contraction, an average value of ratios of expansion or contraction of a plurality of printing media that are successively conveyed.

5. The image forming apparatus according to claim 1, further comprising:
    a plurality of trays that store printing media, wherein
    the storage control unit causes the storage unit to hold the calculated value of the ratio of expansion or contraction for each of the trays, and
    the magnification correcting unit reads out, from the storage unit, a value corresponding to a tray that stores a printing medium that is being conveyed to calculate the difference.

6. The image forming apparatus according to claim 5, wherein, when any of the trays is opened, the storage control unit deletes a value corresponding to the opened tray from among values held by the storage unit.

7. A method of correcting image magnification performed by an image forming apparatus that performs double-side printing, the method comprising:
    calculating, by an expansion/contraction ratio calculation unit, a value of a ratio of expansion or contraction of a printing medium at a time of printing a second surface of the printing medium as compared with that at a time of printing a first surface of the printing medium;
    causing, by a storage control unit, a storage unit to hold the calculated value of the ratio of expansion or contraction while updating the value every time a new value is calculated;
    obtaining, by a magnification correcting unit, a difference between a newly calculated value of the ratio of expansion or contraction and a value that has been held by the storage unit until the new value is calculated, and determines whether or not the difference is within a predetermined range; and
    correcting, by a magnification correcting unit, magnification of an image to be printed on the second surface using the newly calculated value of the ratio of expansion or contraction when the difference is within the predetermined range, and correcting the magnification of the image to be printed on the second surface using a different value than the newly calculated value of the ratio of expansion or contraction when the difference exceeds the predetermined range.

8. A non-transitory computer-readable recording medium that contains a computer program for causing an image forming apparatus that performs double-side printing to implement:
    a function of an expansion/contraction ratio calculation unit that calculates a value of a ratio of expansion or contraction of a printing medium at a time of printing a second surface as compared with that at a time of printing a first surface;
    a function of a storage control unit that causes a storage unit to hold the calculated value of the ratio of expansion or contraction while updating the value every time a new value is calculated; and
    a function of a magnification correcting unit that obtains a difference between a newly calculated value of the ratio of expansion or contraction and a value that has been held by the storage unit until the new value is calculated, and determines whether or not the difference is within a predetermined range, corrects magnification of an image to be printed on the second surface using the newly calculated value of the ratio of expansion or contraction when the difference is within the predetermined range, and corrects the magnification of the image to be printed on the second surface using a different value than the newly calculated value of the ratio of expansion or contraction when the difference exceeds the predetermined range.

* * * * *